3,119,247
LIMITED TORQUE TOOL
Bosko Grabovac, Altadena, Calif., assignor to Torque Controls, Inc., San Gabriel, Calif., a corporation of California
Filed Sept. 22, 1961, Ser. No. 139,977
9 Claims. (Cl. 64—29)

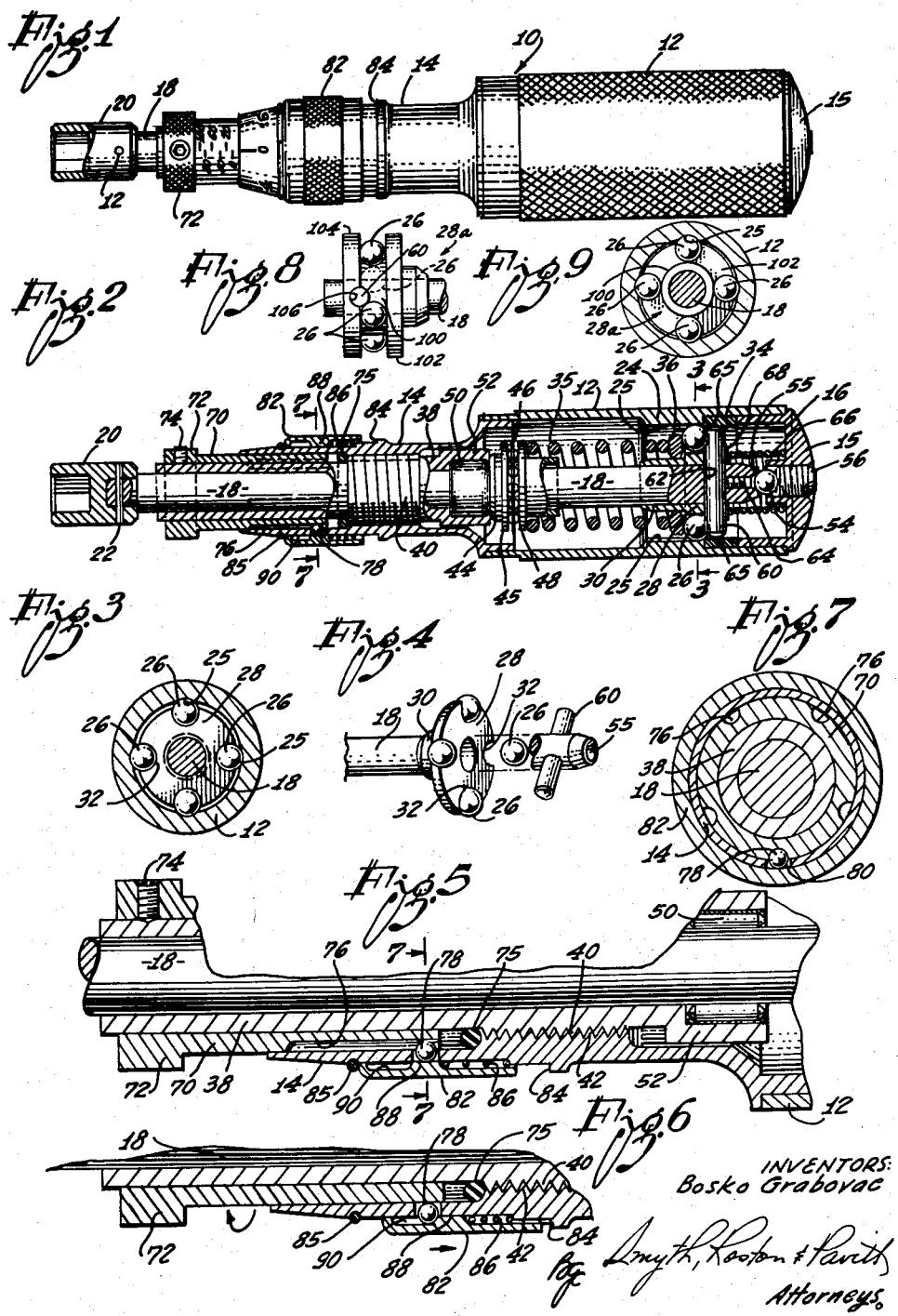
Jan. 28, 1964 — B. GRABOVAC — 3,119,247
LIMITED TORQUE TOOL
Filed Sept. 22, 1961
INVENTOR:
Bosko Grabovac United States Patent Office 3,119,247
Patented Jan. 28, 1964

This invention relates to a torque-applying tool which limits the applied torque to a predetermined maximum and is adjustable to vary the maximum.

While the invention is broadly applicable for its purpose to both power tools and hand tools, it is being initially embodied in a hand tool that may serve either as a socket wrench or as a screw driver. The disclosure herein of this particular embodiment will provide adequate guidance for those skilled in the art who may have occasion to apply the same principles to other specific purposes.

This application is a continuation-in-part of my co-pending application Serial No. 69,449, filed November 15, 1960, and now abandoned, and entitled "Limited Torque Tool."

The selected embodiment of the invention pertains to a hand tool in which the drive member is a handle in the form of a barrel, and the driven member for actuating nuts, screws, and the like, is an elongated member that is journaled inside the handle for rotation relative thereto. Torque is transmitted from the drive member to the driven member by means of metal balls in longitudinal guideways of the handle in abutment with radial means of the driven member. Normally, the balls are yieldingly held in torque-transmitting positions by the pressure of a coil spring that surrounds the inner driven member. Whenever the torque load exceeds a selected maximum that is determined by the spring force, the balls are cammed by the radial means to retracted release positions in opposition to the spring thereby to permit free relative rotation between the drive member and the driven member.

One problem to which the invention is directed is to provide a tool of this general character in which the cooperating parts may be depended upon to function effectively and reliably in a trouble-free manner over a long service period. The requirement here is for a torque-transmitting mechanism that operates efficiently and does so with minimum friction and wear.

Another problem is to provide a compact tool of this character. In this respect, a feature of the initial embodiment of the invention is that the hand tool is no larger than an ordinary screw driver.

A further and important problem that is successfully met by the invention is to provide a construction that is economical and especially a construction that may be easily assembled and calibrated.

The invention is characterized by the concept of providing the inner driven member with radial pin means for torque-transmitting cooperation with the metal balls. Wear is reduced by using hardened metal balls and a hardened radial pin means for cooperation with the balls. The invention teaches that wear of these cooperating parts may be further reduced to a substantial degree, not only by giving the balls freedom to rotate, but also by giving the radial pin means freedom to rotate above its axis.

Reduction of friction and wear is further provided by antifriction bearing means for journaling the driven member inside the cylindrical handle. For this purpose the preferred embodiment of the invention includes a needle bearing to journal an intermediate portion of the driven member and further provides a single ball to serve as a thrust bearing at the end of the driven member.

In addition, the invention reduces the resistance by the spring to relative rotation of the parts. The spring pressure is exerted through an antifriction bearing at one end of the spring, this bearing permitting substantially frictionless relative rotation between the spring and the means for adjustably stressing the spring.

With reference to wear, the invention is further characterized by a sealed construction to prevent particles of metal and other abrasive particles from reaching the working parts of the mechanism. This concept is carried out by closing the outer end of the cylindrical barrel and by providing an elastomer ring to block the entrance of foreign particles into the other end of the cylindrical handle.

The various features and advantages of the invention may be understood from the following detailed description and the accompanying drawings.

In the drawing, which is to be regarded as merely illustrative:

FIG. 1 is a side elevation of the selected embodiment of the invention;

FIG. 2 is a longitudinal sectional view of the same embodiment;

FIG. 3 is a transverse section taken as indicated by line 3—3 of FIG. 2, the view showing the plurality of torque-transmitting balls;

FIG. 4 is an exploded perspective view of the plurality of torque-transmitting balls together with the radial pin means for cooperation therewith;

FIG. 5 is a fragmentary longitudinal sectional view of a portion of the tool on a larger scale showing the latching mechanism in its effective position;

FIG. 6 is a similar fragmentary view showing the latching means in its alternate relief position;

FIG. 7 is a transverse section on an enlarged scale along the line 7—7 of FIG. 5 showing further details of the latching structure;

FIG. 8 is a side elevation of a modified cage arrangement for the torque-transmitting balls that may be used in an alternate embodiment of the invention; and FIG. 9 is a sectional view of the modified cage arrangement.

The selected embodiment of the invention shown in the drawing comprises a hand tool in which the drive member is a cylindrical casing, generally designated 10, comprising a knurled cylindrical handle 12 and a tubular shank 14 of reduced diameter. The handle 12 is closed by an end wall in the form of a cap 15 having a cylindrical skirt 16 that telescopes with a forced fit into the handle. A driven member 18 in the form of a rod of circular cross section is journaled in the drive member 10 for coaxial rotation relative thereto. In this embodiment of the invention the driven member 18 carries a socket fitting 20 at its outer end, the socket fitting being secured by a cross pin 22. If desired, the operating end of the driven member 18 may be equipped with a screwdriver instead of the socket fitting 20.

The interior of the knurled handle 12 of the drive member is formed with a land 24 and the land is further formed with a plurality of longitudinal grooves 25 for cooperation with a corresponding plurality of torque-transmitting balls 26. In this embodiment of the invention there are four equally spaced torque-transmitting balls 26. The grooves 25 are shallow relative to the balls, being, in this instance, of a depth equal to approximately one-quarter of the diameter of the balls. An annular cage 28 having a tubular extension 30 is slidingly mounted on the driven member 18 and is formed with a plurality of peripheral pockets 32 to receive the balls 26 and to keep the balls in rolling engagement with the grooves 25.

A hardened metal ring 34 is held against the end of the land 24 by the cylindrical skirt 16 of the cap 15 and forms stop shoulders at the outer ends of the longitudinal grooves 25 to limit the outward movement of the balls 26 at normal positions of the balls. With the balls 26 seating against the ring 34 at their normal positions the balls have leading exposed portions that extend into a transverse plane normal to the axis of the drive member. In FIG. 2 this transverse perpendicular plane coincides with the plane of the inner edge of the stop ring 34, but need not coincide.

A relatively heavy coil spring 35 surrounds the driven member 18 to exert pressure against the balls 26 to urge the balls towards their normal seated positions. In the construction shown, the spring 35 telescopes over the tubular extension 30 of the cage 28 and a suitable washer 36 is interposed between the spring and the balls, the washer being bonded to the cage. The coil spring 35 is backed up by an adjustment tube 38 which is formed with an external screw thread 40 in engagement with an internal screw thread 42 (FIG. 5) of the shank portion 14. Rotation of the adjustment tube causes longitudinal shift thereof relative to the casing 10 to vary the compression of the coil spring 35 thereby to vary the spring pressure on the torque-transmitting balls 26.

Preferably, an antifriction thrust bearing is interposed between the coil spring 35 and the adjustment tube 38. In the construction shown in the drawing, the end of the adjustment tube 38 abuts an annular means or bushing 44 that is slidingly mounted on the driven member 18 and is formed with a radial flange 45. An annular thrust bearing 46 of a ball bearing type embraces the bushing 44 between the radial flange 45 and a washer 48, the washer 48 encircling the bushing and seating the inner end of the coil spring.

The driven member 18 may be journaled in the drive member in any suitable manner. In the construction shown, an intermediae portion of the driven member is journaled in the adjustment tube 38 by means of a needle bearing 50, the adjustment tube being enlarged to form a cylindrical cage 52 for the needle bearing. The outer end of the driven member 18 is further journaled by a single ball 54 which serves as a thrust bearing. The ball 54 seats in a shallow socket 55 in the end of the driven member 18 and is held in its seat by a set screw 56 that is threaded into the end cap 15.

Suitable means extending radially from the driven member 18 cooperates with the plurality of balls 26 for transmitting torque from the drive member to the driven member. In this embodiment of the invention radial pin means is employed and for this purpose a hardened pin 60 of circular cross-sectional configuration is mounted diametrically in a cross bore 62 of the driven member 18. The pin 60 is positioned for rotation in the previously mentioned perpendicular plane into which the balls 26 extend. Thus, in FIG. 2, the inner longitudinal edge of the pin 60 is in the same plane as the inner edge of the metal stop ring 34.

The pin 60 may be immobilized in the cross bore 62 by means of a small set screw 64. In the preferred practice of the invention, however, the set screw 64 is omitted and the pin 60 is freely rotatable in the cross bore. If the small set screw 64 is omitted, the pin 60 is confined endwise by the surrounding hardened ring 34. Preferably, the pin 60 is formed with rounded ends 65 for point contact with the ring. Preferably, a light coil spring 66 backed against the end cap 15 presses against the pin 60 with a suitable washer 68 interposed between the spring and the pin.

Fixedly mounted on the adjustment tube 38 for rotation therewith is what may be termed an adjustment sleeve 70 which is formed with a knurled flange 72 for manual operation. The adjustment sleeve 70 is secured on the adjustment tube 38 by a suitable set screw 74. An O-ring 75 of rubber-like material embraces the adjustment tube 38 near the inner end of the adjustment sleeve to form an annular seal between the adjustment tube and the surrounding shank portion 14 of the drive member. The O-ring 75 keeps foreign particles, such as metal chips, out of the screw threads 40 and 42 and out of the needle bearing 50 as well as out of the thrust bearing 46.

As indicated in FIGS. 2 and 7, the adjustment sleeve 70 is formed with a plurality of longitudinal latch grooves 76 for cooperation with a latch ball 78. In the construction shown, there are five such grooves 76. The latch ball 78 is mounted in an aperture 80 in the shank 14 and is of substantially greater diameter than the thickness of the shank wall so that the ball may cooperate simultaneously with the aperture and with a selected latch groove 76 to latch the adjustment tube 38 against rotation relative to the surrounding shank.

A latch collar or locking collar 82 is slidingly mounted on the shank 14 for longitudinal movement between a circumferential shoulder 84 of the shank and a thin snap ring 85 that seats in an outer circumferential groove of the shank. The latch collar 82 is cut away on its inner circumference to provide space for a light spring 86. The light spring 86 presses against an inner circumferential rib 88 of the latch collar to urge the latch collar towards a normal position shown in FIG. 5 at which the latch collar abuts the snap ring 85. At this normal position of the latch collar 82 its inner circumferential rib 88 registers with the aperture 80 to confine the latch ball 78 in engagement with a selected latch groove 76, as shown in FIG. 5. If the latch collar 82 is manually retracted against the resistance of the spring 86 to the release position shown in FIG. 6, an inner circumferential groove 90 of the latch collar registers with the aperture 80 to permit the latch ball 78 to move radially outward to a release position to permit manual rotation of the adjustment tube 38 by means of the adjustment sleeve 70.

As indicated in FIG. 1, a portion of the outer circumferential surface of the adjustment sleeve 70 is exposed beyond the end of the shank 14 and this circumferential surface is provided with a suitable scale for indicating torque values. In this instance the scale has the values: 0, 20, 40, 60, 80 and 100. Normally at least the zero mark is concealed by the shank 14. The adjacent end of the shank 14 is tapered and, as shown in FIG. 1, is provided with a series of index marks for reference to the torque scale, there being five index marks around the circumference corresponding to the five latch grooves 76 of the adjustment sleeve. In this instance, the five index marks are, respectively, numerals 0, 4, 8, 12 and 16. Thus, the latching mechanism controlled by the latch collar 82 permits the adjustment tube 38 to be latched at positions representing increments of 4 torque units in the range from 0 torque units to 100 torque units. The torque units may be inch-ounces or inch-pounds.

The manner in which the invention functions for its purpose may be readily understood from the foregoing description. It is apparent that when the torque load is less than the torque setting of the tool, rotation of the knurled handle 12 causes the torque balls 26 to rotate with the handle since the torque balls engage the longitudinal grooves 25 of the handle. Since the torque balls 26 extend into the plane of the radially extending pin 60, a diametrically opposite pair of the torque balls abuts the periphery of the pin to cause the driven member 18 to rotate with the handle. Thus, the whole tool functions as a single unit. If the torque load or resistance to rotation of the driven member exceeds the torque setting of the tool, however, the torque balls 26 are cammed by the pin 60 to retracted positions in opposition to the force of the coil spring 35 and permit the handle or drive member to rotate independently of the driven member.

It may be readily appreciated that the resistance of the torque balls 26 to the cam action depends both on the pressure exerted by the coil spring 35 and the extent to which the torque balls must be cammed or retracted to release the driven member. The extent to which the torque balls must be retracted is determined by the position of the plane of rotation of the pin 60 relative to the normal positions of the balls 26.

In the calibration procedure in the assembling of the tool, the plane of rotation of the pin 60 is adjusted by the set screw 56, the adjustment being made for the highest torque value on the scale on the adjustment sleeve 70. The position of the adjustment sleeve 70 longitudinally of the adjustment tube 38 is then adjusted for the lowest torque value. This last adjustment may affect the first adjustment and make necessary a new adjustment of the set screw 56 for the maximum torque load. In any event, proper adjustment of the set screw 56 and of the adjustment sleeve 70 are easily found for accurate calibration of the tool.

Since the metal balls 26 and the diametrical pin 60 are hardened, they resist wear and, since the balls are free to rotate and the diametrical pin is free to rotate, whatever wear occurs is well distributed to result in a long trouble-free service life. Since the amount of longitudinal contraction of the coil spring 35 over the whole range of torque values is small in comparison to the length of the spring, the spring is not overstressed and this fact also favors a long service life with no reduction of the effective pressure of the spring.

When the imposed load exceeds the torque setting of the tool, the drive member or handle 12 rotates relative to the driven member 18 with relatively little resistance by virtue of the needle bearing 50 and the single ball bearing 54. The thrust bearing 46 interposed between the coil spring 35 and the adjustment tube 38 further minimizes frictional resistance to relative rotation between the drive member or handle 12 and the driven member 18.

The latch ball 78 effectively holds the tool at any selected torque value. If the torque at which the tool yields is to be changed, it is a simple matter to retract the latch collar 82 temporarily against the resistance of the light spring 86 to permit rotation of the adjustment tube 38 by means of the knurled flange 72 of the adjustment sleeve 70. With the latch collar retracted the adjustment tube may be rotated to a new torque setting on the torque scale. Resistance to this adjustment rotation is minimized by the thrust bearing 46.

It is to be noted that the device may be calibrated for a given torque with springs of various rates ranging from weak springs to strong springs. Consequently the strength of the spring is not critical. An important advantage of this flexibility with respect to the fabrication of the device is the choice afforded between the particular advantages of using a relatively weak spring and the particular advantages of using a relatively strong spring.

If it is desired to produce a relatively strong and unmistakable signal when the desired torque is reached, a relatively weak spring is selected so that the hardened diametrical pin must climb over relatively extensive portions of the balls with the balls presenting steep slopes to the pin.

On the other hand, the amount of back-lash or reverse reaction rotation that occurs when the critical torque is reached depends upon the relative portions of the balls that must be climbed by the diametrical pin. If a particular use of the device makes it desirable to minimize this back-lash, a relatively strong spring is used. With a relatively strong spring the diametrical pin climbs over only a small portion of the balls and the balls present only short gradual slopes to the diametrical pin.

FIGS. 8 and 9 show how a modified annular ball cage 28a may be substituted for the previously described annular ball cage 28. Essentially, the modification comprises reducing the diameter of the cage to eliminate the previously described peripheral pockets 32 so that the new ball cage 28a has merely a hub portion 100 that contacts the four balls 26 tangentially. The hub portion 100 serves the same purpose as the eliminated peripheral pockets 32 since it effectively maintains the four balls 26 in the four corresponding inner longitudinal grooves 25 of the knurled handle 12 to cause the balls to yieldingly interlock the handle and the diametrical pin 60 of the driven member 18. The modified ball cage 28a may be further formed with an integral radial flange 102 which receives the thrust of the coil spring 35 and thus replaces the previously mentioned washer 36.

With the elimination of the peripheral pockets 32 of the ball cage it has been found to be desirable to add means to restrict the freedom of the four balls to move axially of the hub portion 100. Otherwise the possibility exists that under some circumstances one of the four balls may be caught on the end of the hub portion to cause operating difficulties. For this purpose the rod or driven member 18 is provided with a fixed radial flange 104. The radial flange 104 has two diametrically opposite radial grooves 106 to clear the hardened pin 60 and thus permit the flange to be spaced sufficiently close to the radial flange 102 for the two flanges to effectively restrict the four balls 26.

The elimination of the four peripheral pockets 32 is highly advantageous because the four pockets must be broached with a high degree of accuracy. The pockets are necessarily broached in succession and it is very difficult to index each step with the required accuracy.

My description in specific detail of the selected embodiment of the invention will suggest various changes, substitutions, and other departures from my disclosure within the spirit and scope of the appended claims.

I claim:

1. In a torque-limiting tool, the combination of: a first cylindrical member having at least one internal longitudinal guideway; a ball mounted in said guideway for movement longitudinally thereof; stop means positioned to block the advance of said ball along said guideway by abutment therewith at a normal position of the ball; spring means urging said ball along said guideway and normally pressing said ball against said stop means; a second member journaled inside said first member for coaxial rotation relative thereto, one of said two members being a drive member and the other of the two members being a driven member, said second member having at least one radial extension with a cylindrically curved surface normally in abutment against a leading portion of said ball whereby said radial extension and said ball cooperate for torque transmission from the drive member to the driven member when the torque load is below a predetermined magnitude, whereby said ball retracts in opposition to said spring means by cam action to permit relative rotation between the drive member and the driven member when the torque load exceeds a predetermined magnitude; and means to vary the stressing of said spring means thereby to vary said predetermined magnitude of the torque load.

2. In a torque-limiting tool, the combination of: a drive member in the form of a cylindrical member closed by an end wall at one end, said cylindrical member having a plurality of inner longitudinal grooves; a corresponding plurality of balls movable along said grooves; stop shoulders carried by said cylindrical member to limit the movement of said balls along said grooves towards said one end of said cylindrical member; an elongated driven member journaled inside said drive member for coaxial rotation relative thereto; means inside said drive member surrounding said driven member and maintaining said balls in rolling engagement with said grooves; a coil spring surrounding said driven member inside said drive member to urge said balls towards said stop shoulders and normally to maintain the balls at normal positions in abutment with the stop shoulders, said balls at their normal positions extending beyond the stop shoulders into a plane perpendicular to the axis of the drive member; a tubular adjustment member surrounding said driven member inside the drive member to back up said spring, said tubular member having a screw thread in threaded engagement with the surrounding drive member for longitudinal adjustment relative to the drive member to vary the compression of the spring thereby to vary the spring pressure against the balls; means effective between said tubular adjustment member and said drive member to releasably latch the tubular adjustment member at selected positions of screw threaded rotation relative to the drive member; means extending radially from said driven member for rotation in said plane whereby the radially extending means normally abuts one of said balls to transmit torque from the drive member to the driven member and the radially extending means retracts the balls by cam action against the pressure of the spring to permit rotation between the drive member and the driven member when the torque load exceeds a predetermined magnitude; and antifriction bearing means inside the drive member embracing and journaling an intermediate portion of said driven member.

3. In a torque-limiting tool, the combination of: a drive member in the form of a cylindrical member; a plurality of balls; means unitary with the drive member to engage said balls and to seat said balls with leading portions of the balls extending into a plane perpendicular to the axis of the cylindrical member and with freedom for the balls to retract from their seated positions; spring means urging said balls towards their seated positions; a driven member journaled inside said drive member for rotation coaxially thereof; and a pin carried by said driven member diametrically thereof for rotation in said plane whereby the pin normally abuts at least one of said balls for torque transmission from the drive member to the driven member and the pin retracts the balls by cam action to permit relative rotation between the drive member and the driven member when the torque exceeds a predetermined magnitude.

4. A combination as set forth in claim 3 in which said balls and said pin are free to rotate for distribution of wear.

5. In a torque-limiting tool, the combination of: a drive member in the form of a cylindrical member; a plurality of balls; means unitary with the drive member to engage said balls and to seat said balls with leading portions of the balls extending into a plane perpendicular to the axis of the cylindrical member and with freedom for the balls to retract from their seated positions; a driven member journaled in said drive member for coaxial rotation relative thereto; a coil spring surrounding said driven member to urge said balls towards their seated positions; means mounted on said driven member cooperative with said seating means for holding said balls in operative positions, said cooperative means having a tubular portion extending into the corresponding end of said spring; pin means carried by said driven member radially thereof in said plane to abut said balls for transmitting torque from the drive member to the driven member; annular means slidingly mounted on said driven member and seating the other end of said spring; a tubular adjustment member surrounding said driven member inside the drive member to back up said spring, said tubular member having a screw thread in threaded engagement with the surrounding drive member for longitudinal adjustment relative to the drive member to vary the compression of the spring thereby to vary the spring pressure against the balls; and a thrust bearing interposed between said tubular adjustment member and said annular means.

6. In a torque-limiting tool, the combination of: a first cylindrical member having a plurality of circumferentially spaced inner longitudinal guide grooves; a corresponding plurality of balls mounted in said guide grooves for longitudinal movement thereof; stop shoulders at the ends of said grooves to block the movement of the balls at normal positions at which leading portions of the balls extend beyond the grooves through a plane perpendicular to the axis of the cylindrical member; spring means to urge said balls towards their normal positions; a second member journaled inside said first member for coaxial rotation relative thereto, one of said two members being a drive member and the other of the two members being a driven member; means surrounding said second member and limiting inward movement of the balls radially of the second member to confine the balls to said guide grooves; and at least one pin extending radially from said second member in said plane whereby the pin and the balls cooperate for torque transmission from the drive member to the driven member when the torque load is below a predetermined magnitude and whereby said pin retracts the balls by cam action in opposition to said spring means to permit relative rotation between the drive member and the driven member when the torque load exceeds a predetermined magnitude.

7. A combination as set forth in claim 6 in which said means surrounding said second member has peripheral pockets engaging said balls respectively.

8. A combination as set forth in claim 6 in which said means surrounding said second member has an outer circumferential cylindrical surface in tangential contact with said balls.

9. A combination as set forth in claim 8 which includes means carried by said second member adjacent said pin to limit movement of the balls relative to the pin.

References Cited in the file of this patent

UNITED STATES PATENTS

| 1,996,311 | Tremolada | Apr. 2, 1935 |
| 2,275,004 | Behl | Mar. 3, 1942 |
| 2,764,882 | Bosworth | Oct. 2, 1956 |
| 2,857,997 | Graybill | Oct. 28, 1958 |
| 2,983,121 | Naas | May 9, 1961 |

FOREIGN PATENTS

| 256,607 | Switzerland | Mar. 1, 1949 |